Nov. 30, 1965   R. V. SAMUELIAN   3,221,247
SOLID STATE CAPACITY SERVO MEASURING SYSTEM
UTILIZING INDUCTIVE FEEDBACK
Filed Feb. 8, 1963

INVENTOR.
ROBERT V. SAMUELIAN
By:
ATTORNEY

United States Patent Office 3,221,247
Patented Nov. 30, 1965

3,221,247
SOLID STATE CAPACITY SERVO MEASURING SYSTEM UTILIZING INDUCTIVE FEEDBACK
Robert V. Samuelian, Scarsdale, N.Y., assignor to Simmonds Precision Products, Inc., Tarrytown, N.Y., a corporation of New York
Filed Feb. 8, 1963, Ser. No. 257,254
4 Claims. (Cl. 324—61)

This invention relates to electrical systems for the measurement of the magnitude of any quantity or parameter which can be represented by a capacitance.

It is an object of this invention to provide an electrical system by means of which the magnitude of any such parameter or quantity can be measured with an accuracy attainable by a servo system, but which employs no moving parts.

It is a further object of this invention to provide an electrical circuit for measuring a medium, the magnitude of a quantity of which is represented by a capacitance, the output of the circuit being directly proportional to the magnitude of said quantity.

It is a further object of this invention to provide an electrical circuit for measuring the magnitude of a quantity of a stored liquid, the output of the circuit being an A.C. voltage which is directly proportional to said magnitude.

It is a further object of this invention to provide an electrical circuit for indicating the volume or mass of a stored liquid, the circuit employing an A.C. generator and a high-gain A.C. amplifier, the output of the circuit being an A.C. voltage which is directly proportional to said volume or mass.

These and other objects of the invention will become apparent from the following description of preferred embodiments of the invention with reference to the accompanying drawings in which.

Figure 1:
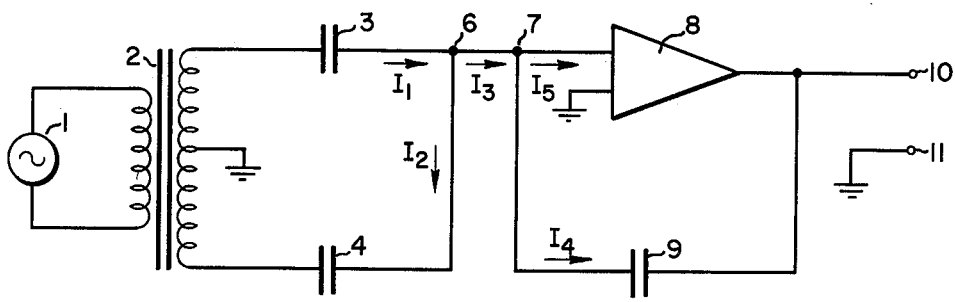
FIGURE 1 illustrates a basic circuit according to the invention.

Referring now to FIGURE 1, the basic circuit comprises a constant voltage precision oscillator 1 the output of which is fed across the primary winding of transformer 2. The secondary winding of this transformer is centretapped to ground and forms part of a capacitance bridge circuit including capacitors 3 and 4 in the two arms thereof, the capacitor 4 being fixed in value and the capacitor 3 being variable and the value of which is to be measured.

A common output terminal 6 of this bridge circuit is connected to a further terminal 7 and thence to the input of a high gain A.C. amplifier 8 which includes a feedback loop from the output thereof to the said terminal 7, a fixed capacitor 9 being connected in series in said loop.

The output of said amplifier appears across terminals 10 and 11.

The component current flow through the circuit is indicated by the references $i_1$ to $i_5$, and the direction of flow is indicated by the arrows adjacent these references.

In order to assist in understanding the operation of this circuit it will be assumed that the voltage at the ends of the secondary winding alternates between E positive and E negative, that the output voltage of the amplifier 8 is $E_o$ negative, and that the capacitor 3 has a value $C_u$ comprised of a fixed value $C_o$ and a variable value $\Delta C$. In addition, the capacitor 4 will be assumed to have a value $C_o$ (equal to the fixed value of capacitor 3) and the capacitor 9 will be assumed to have a value equal to the maximum value of $\Delta C$, i.e. $\Delta C$ max.

The amplifier 8 is so connected in relation to the feedback loop that the input thereof at terminal 7 always tends towards a null or zero value. The voltage and current at terminal 7 is therefore negligible.

The displacement current $i_1$ through capacitor 3 is equal to $wEC_u = wE(C_o + \Delta C)$.

Similarly, the current $i_2$ flowing through capacitor 4 is equal to $wEC_o$.

Thus,
$$i_3 = i_1 - i_2$$
$$= wE(C_o + \Delta C) - wEC_o$$
$$= wE\Delta C$$

The input current $i_5$ to the amplifier 8 is equal to
$$i_3 - i_4 \approx 0.$$

Thus,
$$i_3 = i_4$$

or
$$wE\Delta C = wE_o \Delta C \text{ max.}$$
$$E\Delta C = E_o \Delta C \text{ max.}$$
$$\frac{\Delta C}{\Delta C \text{ max.}} = \frac{E_o}{E}$$

Thus, since E is held constant
$$E_o \propto \frac{\Delta C}{\Delta C \text{ max.}}$$

The output voltage $E_o$ therefore varies directly in proportion to the change in the unknown variable value of capacitance $\Delta C$.

Figure 2:
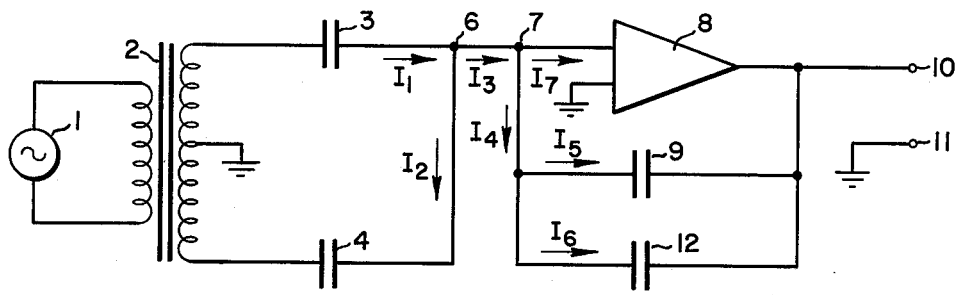
FIGURE 2 illustrates a circuit according to the invention for measuring the mass of a stored liquid.

Referring now to FIGURE 2 there is shown a circuit similar to that illustrated in FIGURE 1 but in which a further feedback capacitor 12 is connected in parallel across the capacitor 9.

In this embodiment the capacitor 3 is a capacitance-sensing probe at least partially immersed in a liquid consisting, for example, of a fuel stored in a tank. The capacitor 12 is wholly immersed in said liquid and its dielectric comprises said liquid.

The component current references $i_1$–$i_3$ are the same as the corresponding references in FIGURE 1, and the remaining current references $i_4$ to $i_7$ similarly indicate the component current flow through the circuit, the direction of flow again being indicated by the arrows adjacent to these references.

A general equation which relates the dielectric constant K to density D for many liquids is $$\frac{K-1}{D} = A(K-1) + B$$

where A and B are constants.

In the following calculations it will be assumed that the capacitor 4 has a fixed value $C_E$, the capacitor 9 a fixed value $C_1$ and the capacitor 12 has a fixed valve $KC_c$, that is, its capacitance is dependent on the liquid in which it is immersed.

The potential relationships E, $E_o$ are the same as those in the preceding figure and the capacitor 3 (the capacitance sensing probe in the tank) is assumed to have a value $C_t = C_E + h(k-1)C_E$ where $h$ is the height of liquid in the sensing probe, and $C_E$ is the capacitance of the probe when $h=0$, that is, when the tank is "empty."

The displacement current $i_1$, through the capacitor 3 is equal to $wEC_T = wEC_E + wEh(k-1)C_E$.

Similarly, the displacement current $i_2$ through the capacitor 4 is equal to $wEC_E$.

As before, $i_3 = i_1 - i_2$
$$= wEh(k-1)C_E$$

The input current $i_7$ to the amplifier 8 will again be approximately zero, thus where
$$i_3 = i_4 = i_5 + i_6$$
$$i_5 = wE_oC_1$$
$$i_6 = wE_oKC_c$$
Thus,
$$wEh(k-1)C_E = wE_oC_1 + wE_oKC_c$$
$$h(k-1)C_E = \frac{E_o}{E}(C_1 + KC_c)$$
$$= \frac{E_o}{E}[(C_1 + C_c) + (k-1)C_c]$$
$$h(k-1) = \frac{E_o}{E}\left[\frac{C_1 + C_c}{C_E} + \frac{C_c}{C_E}(k-1)\right]$$

By choosing the relationships of the capacitances of the capacitors $9(C_1)$ and $12(kC_c)$ so that the constant $$A = \frac{C_c}{C_E}$$

and that the constant $$B = \frac{C_1 + C_c}{C_E}$$

the capacitance of the capacitor $4(C_E)$ being dependent on the capacitance-sensing probe 3.
Then,
$$h(k-1) = \frac{E_o}{E}[A(k-1) + B]$$
$$= \frac{E_o}{E}\frac{(k-1)}{D}$$
Thus,
$$hD = \frac{E_o}{E}$$

Since E is held constant, $E_o$ is therefore directly proportional to the mass of liquid remaining in the tank, that is, the product of the density and volume of the liquid, the volume of that liquid being proportional to the height thereof in the probe.

Thus, in this application, a standard capacitance-sensing probe of appropriate length can be used and assuming that the fuel tank is of uniform cross-section the output $E_o$ will be proportional to the mass of liquid remaining in the tank provided that the capacitance values of capacitors 9 and 12 have been determined as indicated above in dependence upon the constants A and B. If the tank is of non-uniform cross-section the proportionality between output $E_o$ and the mass of liquid remaining in the tank will vary in dependence upon this non-uniformity.

Figure 3:
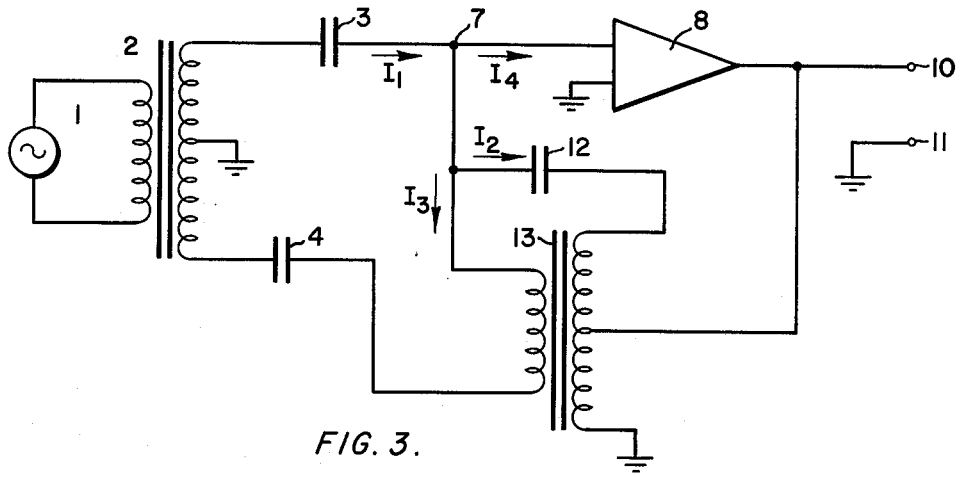
FIGURE 3 illustrates a circuit according to the invention for measuring the volume of a stored liquid.

Referring now to FIGURE 3, there is shown a circuit similar to that shown in FIGURE 1 but in which the feedback loop includes a transformer 13 coupled to the capacitance bridge circuit.

The transformer includes a primary winding connected between the capacitor 4 and the terminal 7 adjacent the input of the amplifier 8, and a secondary winding connected between ground and the capacitor 12 which in turn is connected to a junction between the primary winding and the terminal 7.

The secondary winding is tapped and this tapping is connected to the output of the amplifier 8 to complete the feedback loop.

In the following calculations it will be assumed that, as was the case in the FIGURE 2 embodiment, the capacitor 4 has a fixed value $C_E$ and the capacitor 3 has a value $C_T = C_E + h(k-1)C_E$.

In addition, the voltage at the ends of the secondary winding of transformer 2 will be assumed to alternate between E positive and E negative, the output voltage of the amplifier 8 will be assumed to be $aE$ negative, where $a$ is a variable, and the capacitor 12 will be assumed to have a value $$C_c = kC_E\frac{N_1}{N_2}$$

where $N_1$ is the number of turns on the primary of transformer 13 and
$N_2$ is the number of turns on the secondary of transformer 13.

The primary turns $N_1$ of transformer 13 are further assumed to be equal to the number of secondary turns on this transformer between the tapping point thereon and ground.

In this embodiment the displacement current $i_1$ through the capacitor 3 is equal to $$jwEC_T = jwE[C_E + hC_E(k-1)]$$

The current $i_2$ flowing through the capacitor 12 is equal to $$\frac{N_2}{N_1}aE(jwC_c) = \frac{N_2}{N_1}aE\left(C_Ejwk\frac{N_1}{N_2}\right)$$
$$= jwaEkC_E$$

The input current $i_4$ to the amplifier 8 will again be approximately zero
thus
$$i_1 = i_2 + i_3$$
where
$$i_3 = jwC_E(E - aE)$$
$$= jwEC_E(1 - a)$$
Thus,
$$jwE[C_E + hC_E(k-1)] = jwaEKC_E + jwEC_E(1-a)$$
$$1 + h(k-1) = ak + (1-a)$$
$$= a(k-1) + 1$$
$$h(k-1) = a(k-1)$$
$$\therefore h = a$$

The output voltage $aE$ is therefore directly proportional to the height $h$ of liquid within the sensing probe.

Thus, in this application, a standard capacitance-sensing probe of appropriate length can be used. The turns ratio $N_1:N_2$ is chosen in dependence upon the cross-sectional area of the tank and the capacitance value of capacitor 12 is determined from the above equation which takes account of both this turns ratio and the dielectric constant of the liquid. In this way the output voltage $aE$ will be directly proportional to the volume of liquid remaining in the tank, the choice of turns ratio catering for variations in the cross-sectional areas of tanks.

In each of the embodiments described, the alternating output voltage may conveniently be measured by a voltmeter or a ratiometer.

The alternating voltage may further be converted to a D.C. voltage and may, for example, be utilised for telemetering purposes.

While there have been described what are at present considered to be preferred embodiments of the invention, it will be obvious to those skilled in the art that various changes and modifications may be made within the scope of the appended claims without departing from the scope and spirit of the invention.

I claim:
1. A system for measuring the volume of a liquid stored in a container of known dimensions, comprising
   a source of constant amplitude A.C. voltage,
   a high-gain A.C. amplifier having a pair of input terminals and a pair of output terminals,
   a capacitance bridge having two arms and connected between said source and the input terminals to said amplifier, said bridge circuit comprising
   a capacitor in each arm thereof, the capacitor in one arm thereof having a fixed value and the capacitor in the other arm having a value variable between upper and lower limits in dependence on, and proportional to, any change in said parameter, the lower of said limits having a value equal to the fixed value of the capacitor in said one arm, and a transformer having a primary winding and a secondary winding, the primary winding being connected in the one arm of said bridge circuit between the capacitor therein and one of said amplifier input terminals, a tapping point on said secondary winding dividing said secondary winding into two portions, one of said portions being connected between said output terminals of the amplifier, a further capacitor, said further capacitor being connected in series with the other portion of said transformer between said one input terminal of the amplifier and an output terminal of said amplifier, said further capacitor and said transformer comprising a feedback loop for said amplifier and arranged to reduce towards zero the input current to said amplifier whereby the voltage at the output terminals of said amplifier is rendered proportional to the variable value of the capacitor in said other arm of the bridge.

2. A system as claimed in claim 1, wherein the number of turns in the primary winding of the transformer is equal to the number of turns on the one portion of the secondary winding of the transformer.

3. A system as claimed in claim 2, wherein the said further capacitor has a value equal to the product of the dielectric constant of the liquid, the turns ratio of the primary to secondary windings of the transformer and the capacitance value of the capacitor on the one arm of the said bridge.

4. A system for measuring a parameter of a fluid medium comprising a source of constant amplitude A.C. voltage, a high gain negative-feedback A.C. amplifier having a pair of input terminals and a pair of output terminals and a negative-feedback loop whereby the current applied to the input terminals of said amplifier is continuously reduced substantially to zero, said system further comprising a multi-arm capacitance bridge circuit connected between said source and the input terminals to said amplifier, said bridge circuit having two capacitors in different arms thereof, one of which has a fixed value and the other of which has a value variable between upper and lower limits in dependence on, and proportional to, any change in said parameter, the lower of said limits having a value equal to the fixed value of said one capacitor, and a further capacitor connected in said feedback loop, said further capacitor having a fixed value bearing a predetermined relationship to the variable value of said one capacitor whereby the voltage at the output terminals of said amplifier is rendered proportional to the said variable value, said fluid being a liquid and wherein said further capacitor is immersed in said liquid, the value thereof being dependent on the dielectric constant of said liquid, said value of the further capacitor bearing a first predetermined relationship to the value of said one capacitor for a liquid of predetermined characteristics, said parameter being the volume of the liquid, and a feedback transformer having a primary winding and a secondary winding, the primary winding being connected in said bridge circuit between said one capacitor and one of said amplifier input terminals, a tapping point on said secondary winding dividing the secondary winding into two portions, one of said portions being connected between said further capacitor and one of said amplifier output terminals, and the other portion being connected between said one and the other output terminals of the amplifier, the number of turns on said primary winding being equal to the number of turns on said other portion of the feedback transformer.

References Cited by the Examiner
UNITED STATES PATENTS

| | | | |
|---|---|---|---|
| 2,719,262 | 9/1955 | Bousman | 324—57 |
| 2,908,166 | 10/1959 | Johnson | 324—62 |
| 2,978,638 | 4/1961 | Wing et al. | 324—62 |

FOREIGN PATENTS 914,528  1/1963  Great Britain.

WALTER L. CARLSON, *Primary Examiner.*